(12) United States Patent
Tien

(10) Patent No.: US 7,434,891 B2
(45) Date of Patent: Oct. 14, 2008

(54) STRUCTURE OF A SPOKE POSITIONING POCKET

(76) Inventor: Tseng-Ping Tien, No. 20, Li Fen Rd., Hou Li Hsiang, Taichung Hsien (TW)

(*) Notice: Subject to any disclaimer, the term of this patent is extended or adjusted under 35 U.S.C. 154(b) by 107 days.

(21) Appl. No.: 11/483,343

(22) Filed: Jul. 10, 2006

(65) Prior Publication Data

US 2008/0007110 A1    Jan. 10, 2008

(51) Int. Cl.
  *B60B 1/04*  (2006.01)
  *B60B 21/06* (2006.01)
(52) U.S. Cl. .......................... 301/58; 301/104
(58) Field of Classification Search ............ 301/55, 301/58, 61, 59, 104; 411/58, 61
  See application file for complete search history.

(56) References Cited

U.S. PATENT DOCUMENTS

| | | | | |
|---|---|---|---|---|
| 291,457 | A * | 1/1884 | Woodard | 301/58 |
| 574,139 | A * | 12/1896 | Curry | 301/56 |
| 4,917,552 | A * | 4/1990 | Crawford | 411/32 |
| 5,314,278 | A * | 5/1994 | Weber | 411/61 |
| 5,419,664 | A * | 5/1995 | Hengesbach et al. | 411/61 |
| 5,806,935 | A * | 9/1998 | Shermeister | 301/58 |
| 6,270,303 | B1 * | 8/2001 | Gauthier et al. | 411/60.1 |
| 6,524,046 | B2 * | 2/2003 | Hsu | 411/61 |
| 6,776,460 | B1 * | 8/2004 | Lo | 301/58 |
| 6,779,853 | B1 * | 8/2004 | Chang | 301/58 |
| 6,811,228 | B2 * | 11/2004 | Tien | 301/58 |
| 6,848,752 | B1 * | 2/2005 | Tien | 301/95.101 |
| 6,890,040 | B2 * | 5/2005 | Chen | 301/58 |
| 6,938,962 | B1 * | 9/2005 | Schlanger | 301/58 |
| 2005/0110333 | A1 * | 5/2005 | Tien | 301/58 |

* cited by examiner

*Primary Examiner*—Jason R Bellinger
*Assistant Examiner*—Kip T Kotter
(74) *Attorney, Agent, or Firm*—Egbert Law Offices

(57) ABSTRACT

The rim spoke positioning pocket is a single metal plate placed in a cylindrical shape. One embodiment is coiled, and another embodiment is an expanded cylinder. A through hole is placed in the center of the positioning pocket, and the bottom has claws that are circular in shape and expandable outward. The inside surface corresponds to the claw shape to received a spoke tip connector, and the top of the positioning pocket is a straight opening. One side of the positioning pocket forms a connecting part by a coiled metal plate. The rim spoke positioning pocket for a bicycle or motorcycle can be made with simple steps and a low cost, which is better for mass production.

1 Claim, 9 Drawing Sheets

STRUCTURE OF A SPOKE POSITIONING POCKET

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to the structure of a spoke positioning pocket for bicycles or motorcycles, and more particularly to a structure of coiled or extended metal plate.

BACKGROUND OF THE INVENTION

The spoke of a regular bicycle or motorcycle is usually placed between the rim and a center axle. Each spoke is usually hooked to the center axle on the inside, and the outside of the spoke has an expanded tip for connecting to the joint hole of the rim. The traditional joint hole of the rim goes through the rim to expand the expanded tip from the external side of the rim to the joint hole of the rim, and it is screwed tightly on the outside of the spoke. Because the joint hole of the rim goes through the rim problems are created, such as leaking air and water being able to get inside the rim.

The industry developed another combination structure using a positioning pocket, so that the expanded tip of the spoke can be inserted into the joint hole of the rim directly to position the structure. As shown in FIGS. 1 and 2, the conventional positioning pocket 10 is in a cylinder shape, and its top end forms a protruding ring 11 to push against the surface of the joint hole 21 of the rim 20. The bottom of the positioning pocket 10 has a claw shape 12, and the use of the conventional structure is to place the expanded tip 31 of the spoke 30 and the positioning pocket 10 into the joint hole 21 of the rim 20. The expanded tip 31 is pulled back from the spoke 20, so that it is locked in the slot 13 formed inside the claw 12 (as shown in FIG. 2) and so that the structure is positioned.

However, the actual application of the conventional positioning pocket still has problems. The claw 12 of the positioning pocket 10 must have good elasticity to be inserted into the joint hole 21 of the rim 20, and after it is positioned, it must have enough strength to handle external forces. Therefore, the ideal material for positioning pocket 10 is metal. It would be a challenge for the structure to be made of metal because the entire structure of the conventional positioning pocket has a cylindrical shape, the bottom forms the expanded claw 12 in a circular shape, and a protruding ring 11 is formed on the top. Even though it is possible, the cost of the processing procedures is also too complicated and costly since the positioning pocket has a unitary shape; therefore, it is not practical.

Moreover, the protruding ring 11 at the top of the conventional positioning pocket 10 can push against the surface of the joint hole 21 of the rim 20 to create a pleasant appearance and to prevent water from leaking. However, when the expanded tip 31 is pulled, the positioning pocket 10 is pulled toward the spoke, causing the protruding ring edge 11 to expand and to lose the tight seal to the surface of the joint hole 21 of the rim 20 (space marked A in FIG. 2).

Thus, to overcome the aforementioned problems of the prior art, it would be an advancement in the art to provide an improved structure that can significantly improve efficacy.

To this end, the inventor has provided the present invention of practicability after deliberate design and evaluation based on years of experience in the production, development and design of related products.

BRIEF SUMMARY OF THE INVENTION

The primary feature of the present invention is the positioning pocket formed by a single metal plate. The positioning pocket 40 of this preferred embodiment is coiled into a cylindrical shape, and the positioning pocket 40B of another preferred embodiment is a single metal plate expanded into a cylindrical shape. By this improvement, the rim spoke positioning pocket is made simple, and cost is reduced to facilitate mass production.

Moreover, the positioning pocket 40 of the present invention uses the unique structure where inner groove edge 46 is formed between the claws and through the setting of the inner groove edge 46 to stress the connection at the root of the claws 43. When the positioning pocket 40 is coiled in a cylindrical shape, the surface can form a smooth curve to prevent the corner from being folded.

In addition, the positioning pocket 40 of the present invention eliminates the conventional protruding edge (as mentioned in prior art) to make the production more simple and to avoid the bulging look created by the protruding ring.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
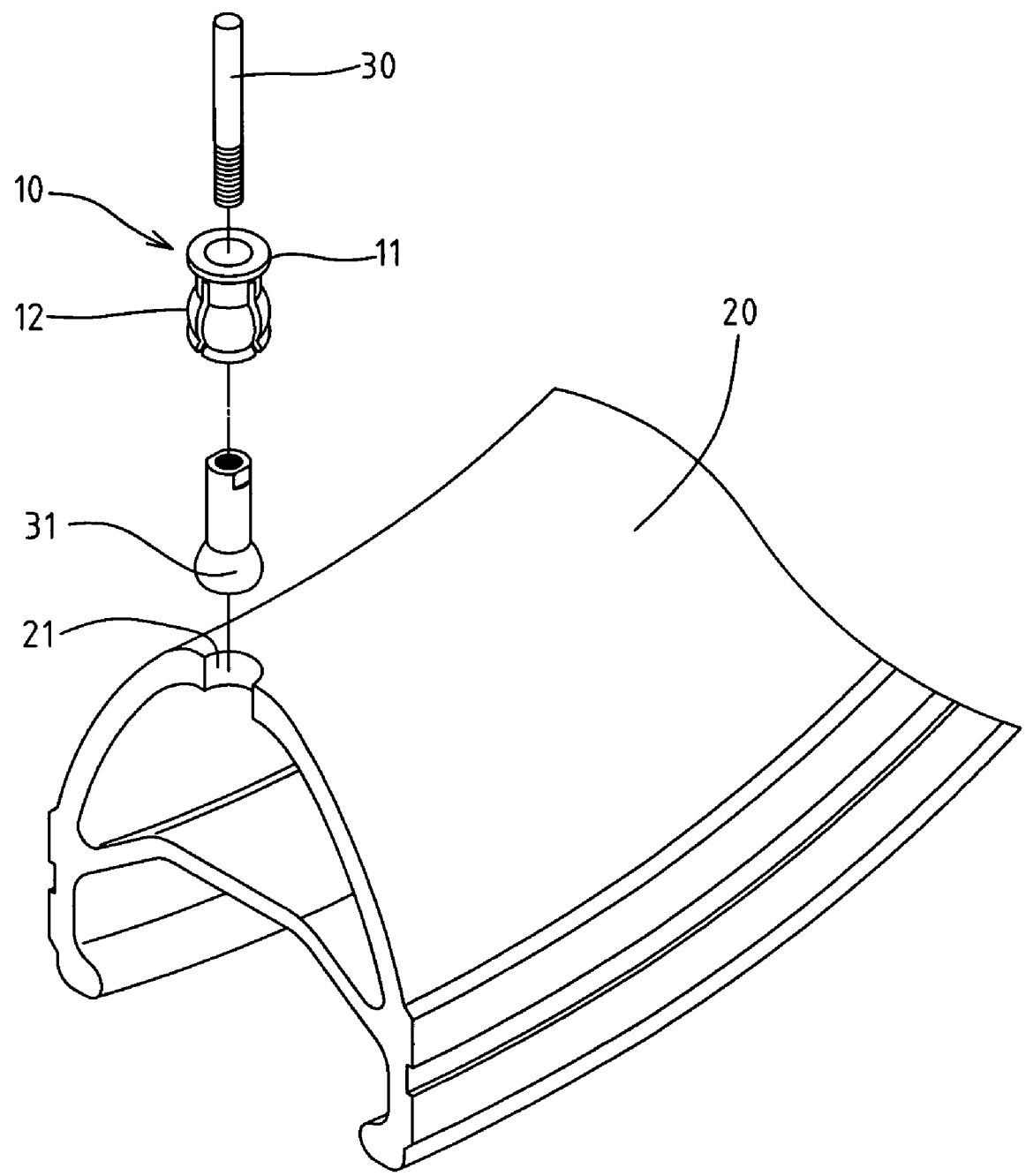
FIG. 1 shows an exploded perspective view of the conventional structure.
Figure 2:
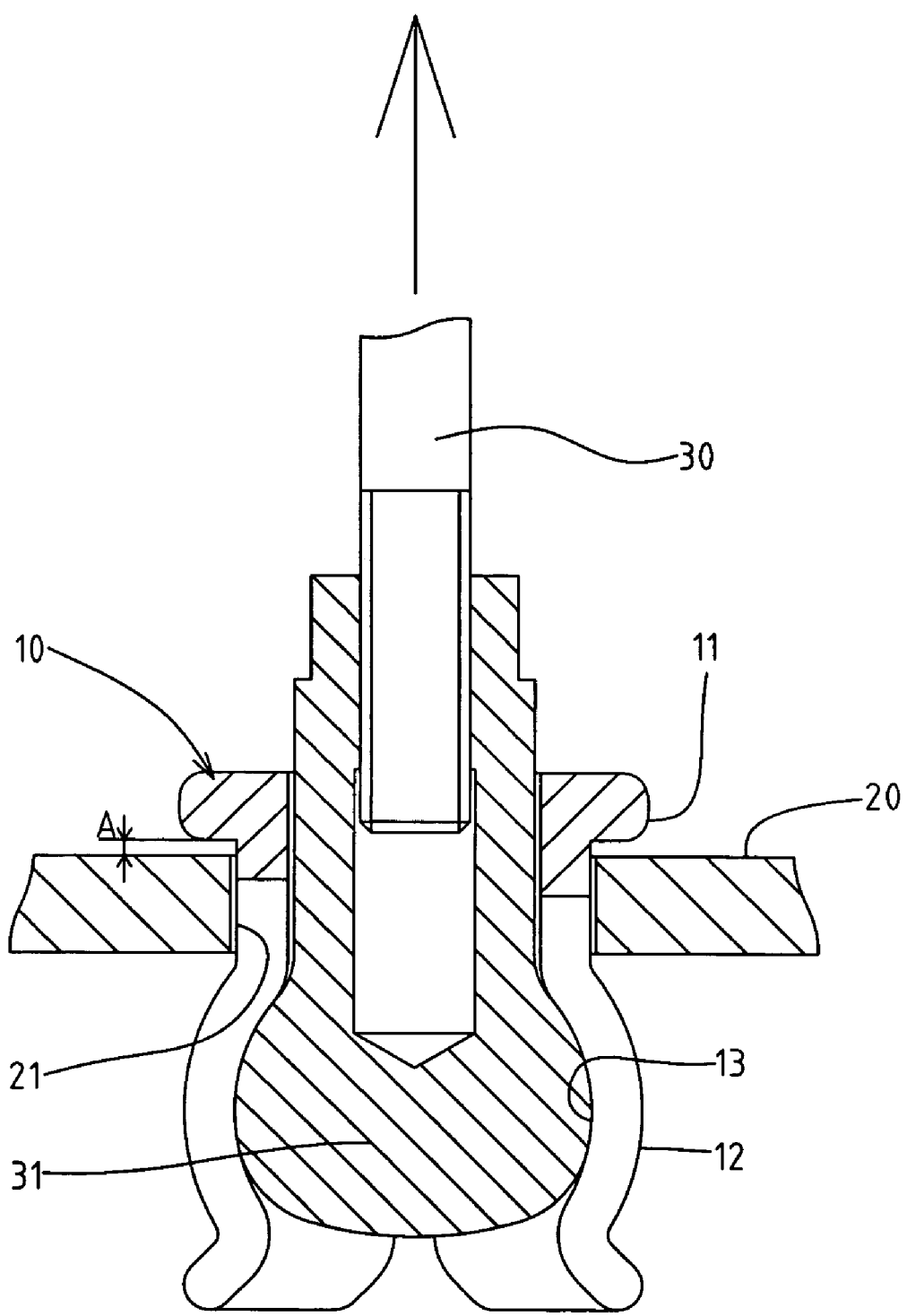
FIG. 2 shows an assembled sectional view of the conventional structure.
Figure 3:
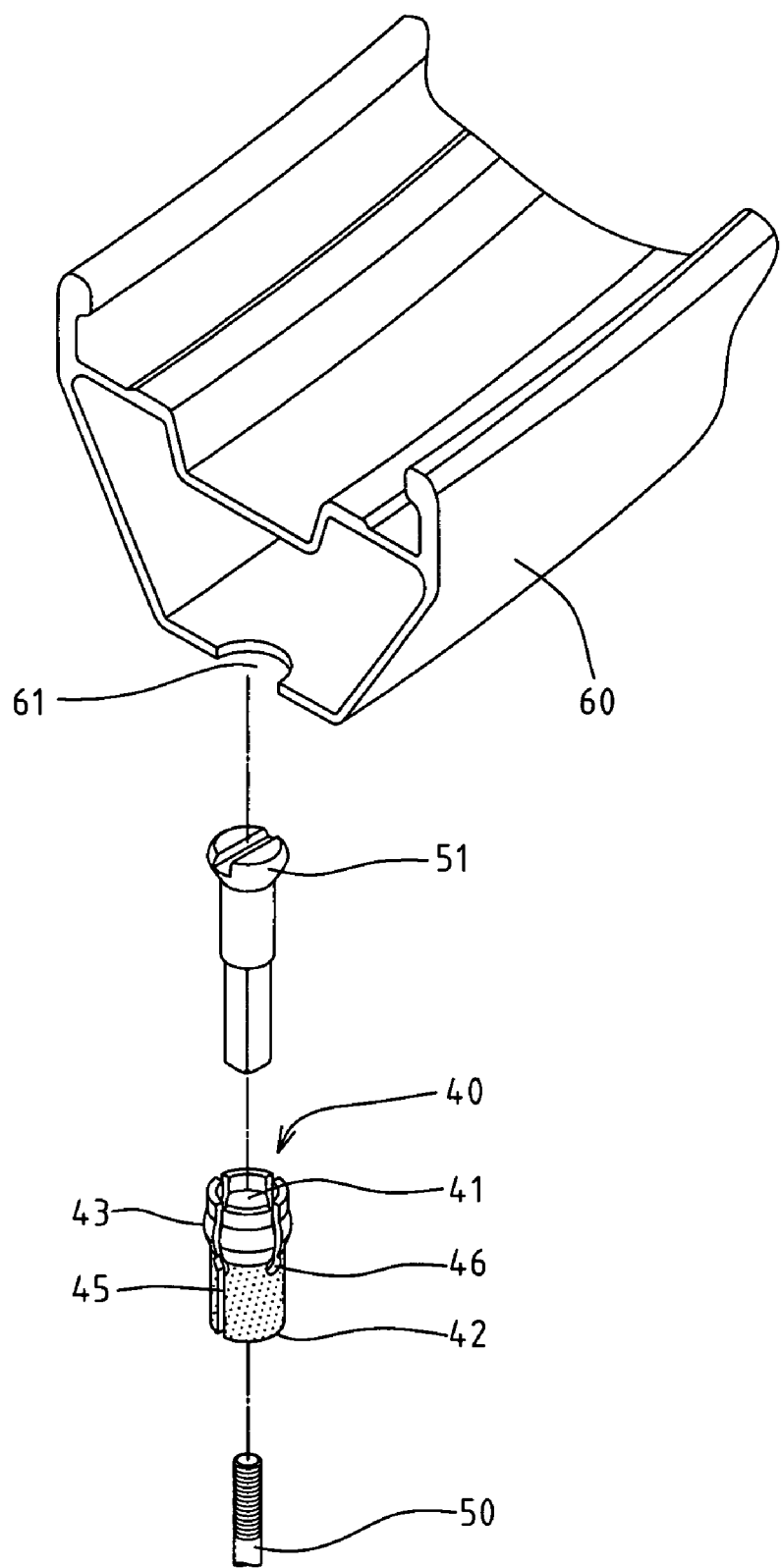
FIG. 3 shows an exploded perspective view of the preferred embodiment of the present invention.
Figure 4:
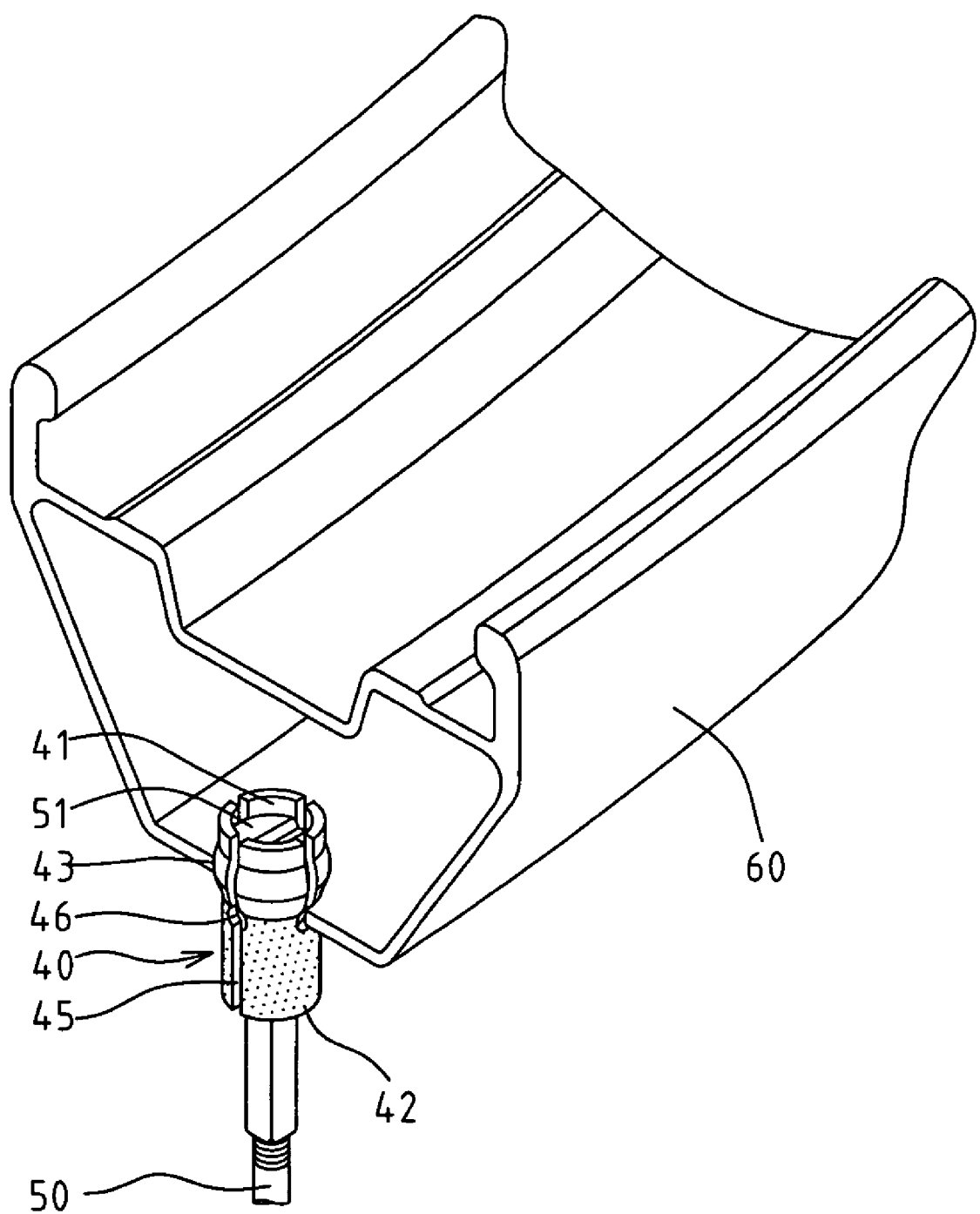
FIG. 4 shows an assembled perspective view of the preferred embodiment of the present invention.
Figure 5:
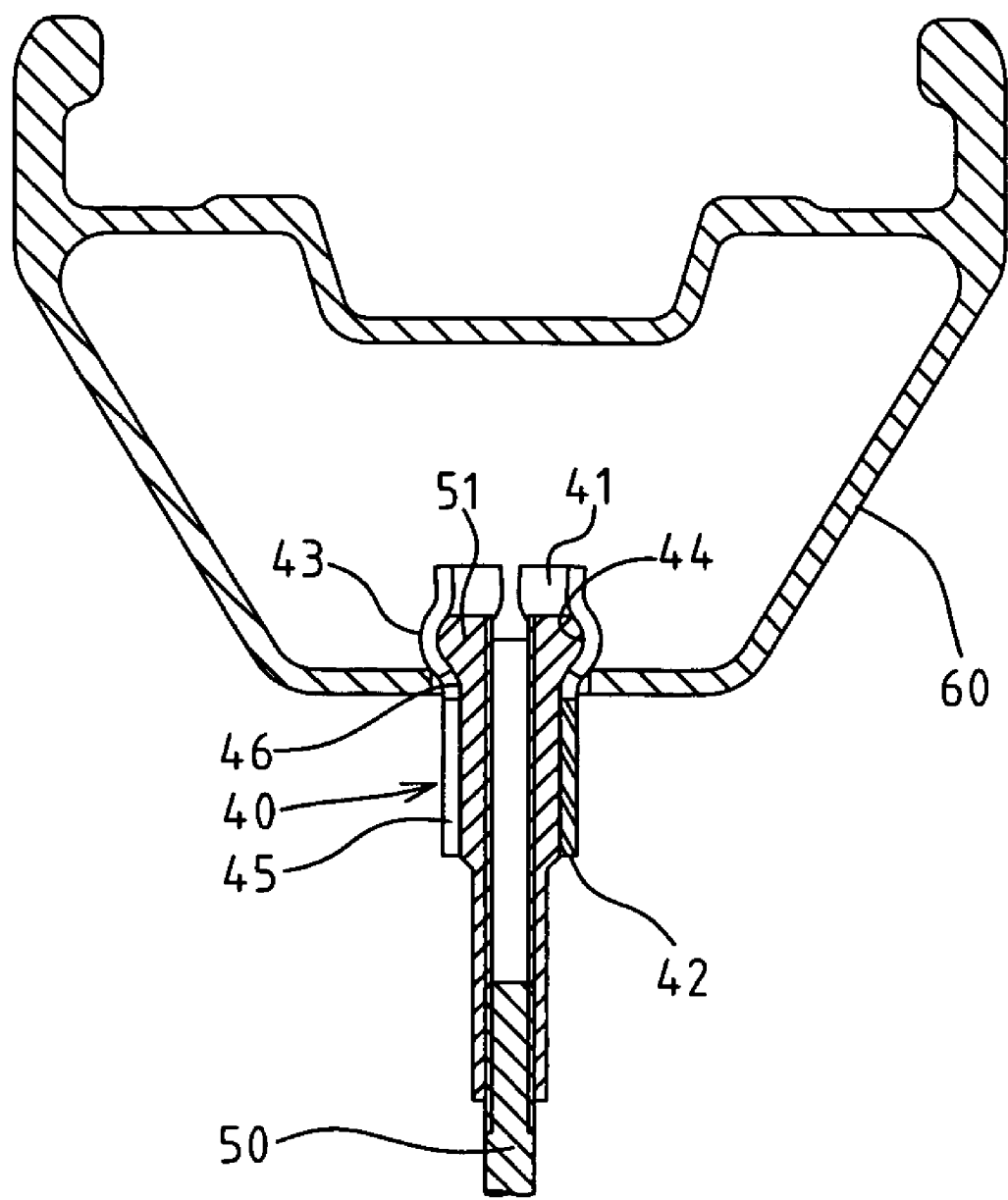
FIG. 5 shows an assembled sectional view of the preferred embodiment of the present invention.

First, FIGS. 3, 4, 5 show the preferred embodiment of the structure of a spoke positioning pocket. The rim mentioned herein includes the rim for a bicycle or motorcycle. The positioning pocket 40 mentioned herein is used for the expanded tip 51 of the spoke 50, when the spoke 50 is placed inside the joint hole 61 of the rim 60.

The positioning pocket 40 disclosed in the present invention is a single metal plate coiled to form the cylinder. A through hole 41 is placed in the center of the positioning pocket, and the top end 42 of the positioning pocket is a straight opening. Its bottom has a claw 43 that is circular in shape and expands outwardly. The inside corresponds to the claw shape to form a spoke tip connector 44, and one side of the positioning pocket 40 forms a connecting part 45 formed by the coiled metal plate mentioned above.

The above embodiment has an inner groove edge 46 formed between the roots of the claws 43. The inner groove edge 46 disclosed in the present embodiment is circular in shape, and through the setting of the inner groove edge 46 to stress the connection at the root of the claws 43, so that when the positioning pocket 40 is coiled in a cylinder shape, the surface can be a smooth curve to prevent the corner from being folded.

Figure 6:
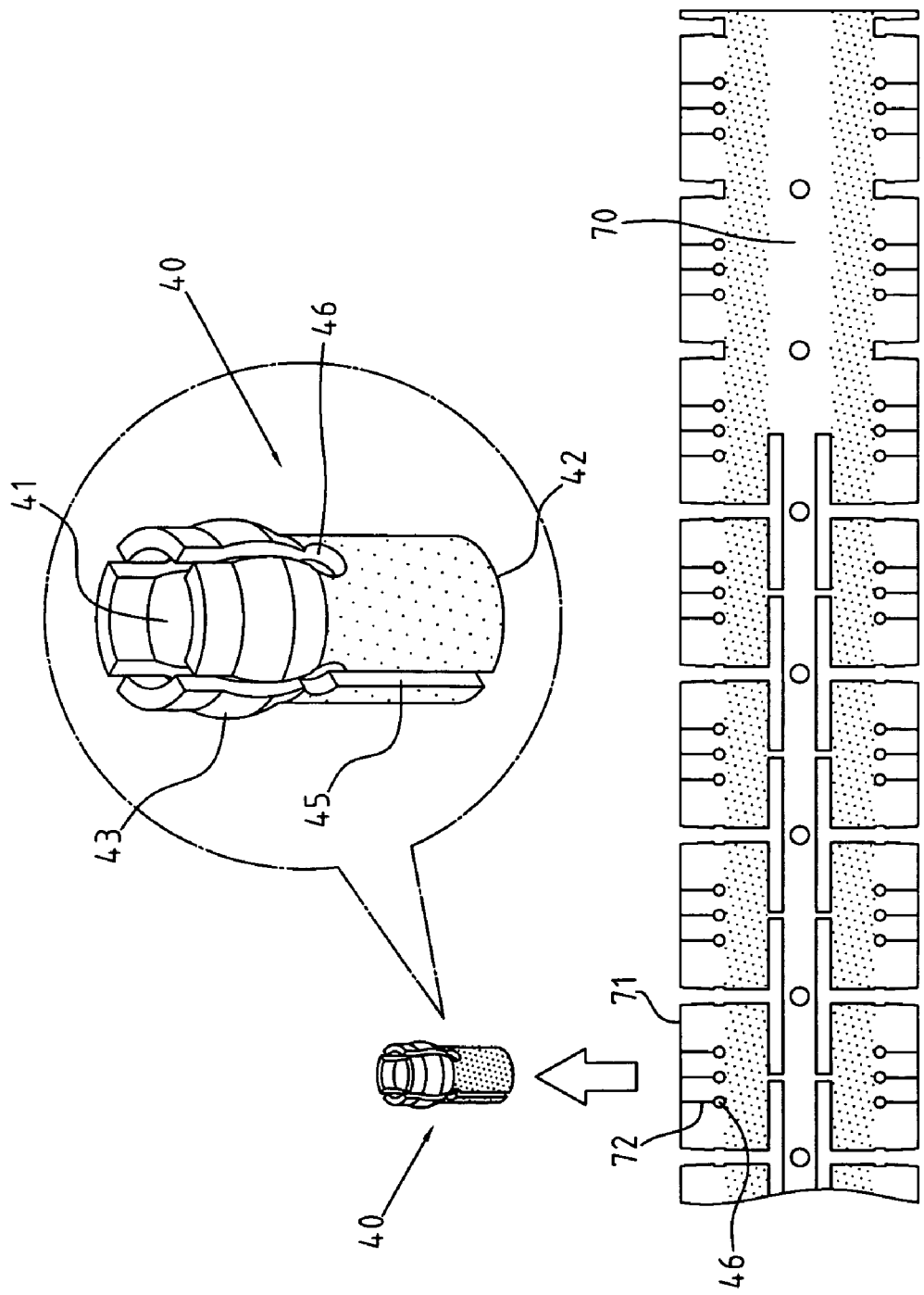
FIG. 6 shows a schematic view of a diagram of the preferred embodiment of the present invention.

As for the idea of the positioning pocket 40 mentioned above to be in the coiled shape, as shown in FIG. 6, the making of the positioning pocket 40 uses a long metal material 70 to form several rectangular chips 71 for a single positioning pocket 40 by the thrust method. All rectangular chips are connected to the disconnecting line 72 and inner groove edge 46 that separate the claws 43. By so doing, the rectangular chip 71 can be coiled to make the positioning pocket 40.

Through the above structure and design, the operation of the present invention can be explained.

Figure 7:
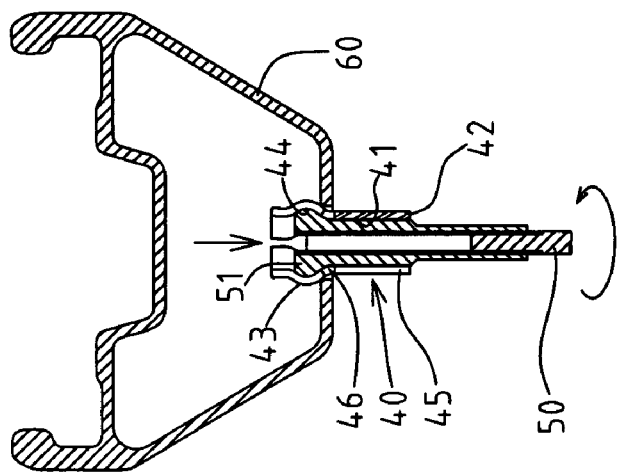
FIG. 7 shows a sectional view of Step 1 of assembling the preferred embodiment of the positioning pocket of the present invention.
Figure 8:
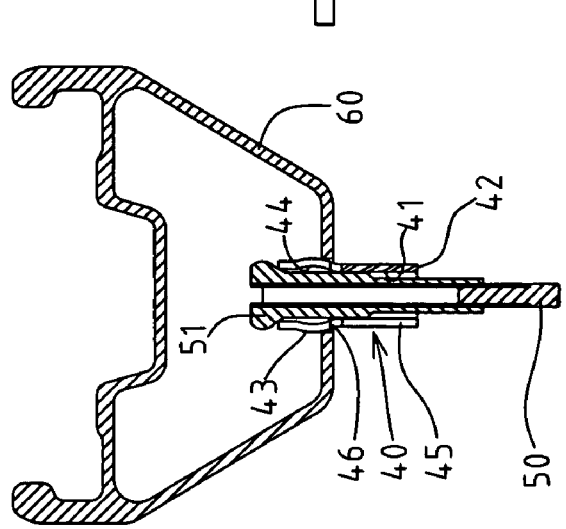
FIG. 8 shows another sectional view of Step 2 of assembling the preferred embodiment of the positioning pocket of the present invention.
Figure 9:
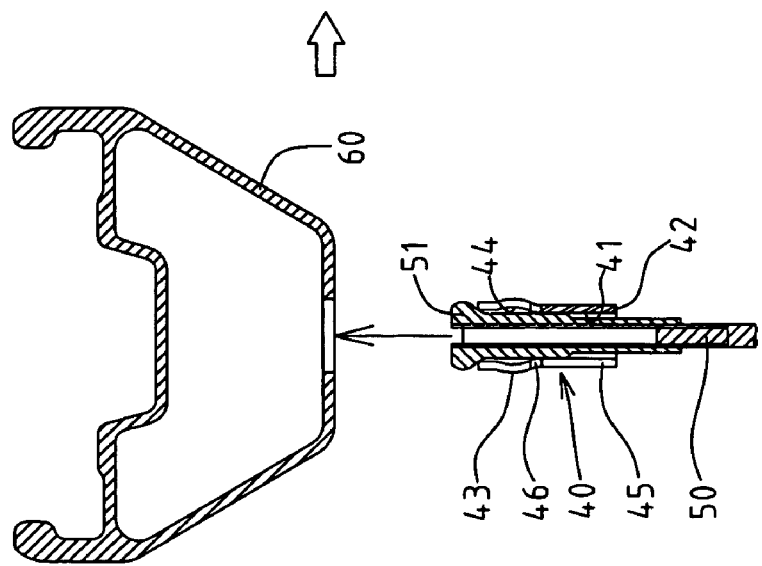
FIG. 9 shows a sectional view of Step 3 of assembling the preferred embodiment of the positioning pocket of the present invention.

As shown in FIG. 7, when the positioning pocket 40 is assembled, it is placed on the spoke 50, and the expanded tip 51 of the spoke is inserted into the joint hole 61 of the rim 60. The positioning pocket 40 is inserted into the joint hole 61 by one end that has claw 43 (as shown in FIG. 8). As shown in FIG. 9, the spoke 50 is pulled back to make sure that the expanded tip 51 is locked into the spoke tip connector 44 of the positioning pocket 40, and then the expanded tip 51 is tightened up. The expanded tip is screwed to the spoke. Now, the spoke 50 and the rim 60 are positioned.

Figure 10:
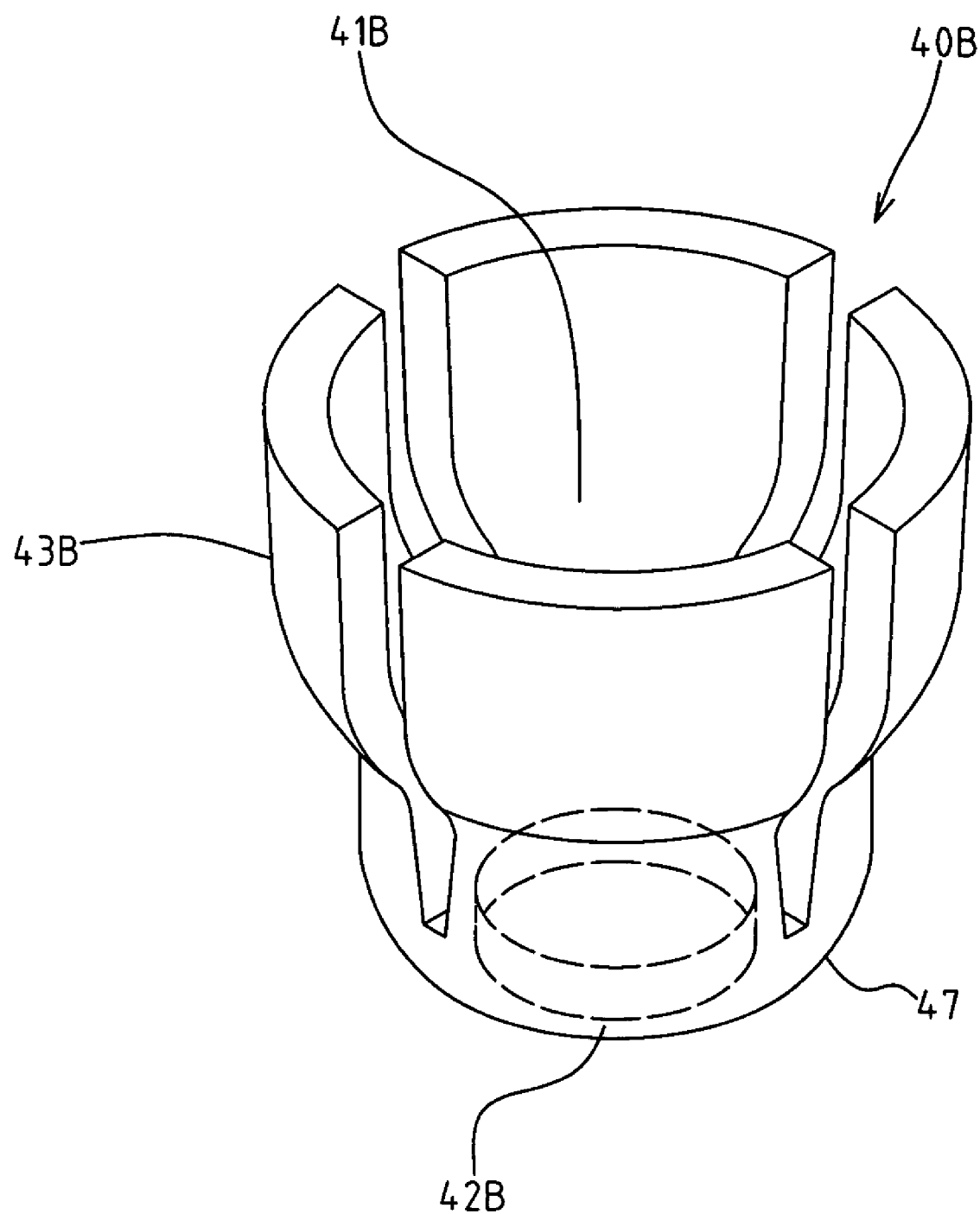
FIG. 10 shows a perspective view of another preferred embodiment of the positioning pocket of the present invention.

As shown in FIG. 10, there is another embodiment of the rim spoke positioning pocket. The positioning pocket 40B is a single metal plate in cylindrical shape, and a through hole 41B is placed in the center of the positioning pocket 40B. The top 42B of the positioning pocket is a straight opening formed into end 47, and the bottom has several claws 43B that are in circular shapes and that expand outwardly. The inside corresponds to the claw shape to form a spoke tip connector. The edge of the top of the positioning pocket can be a cone shape.

Figure 11:
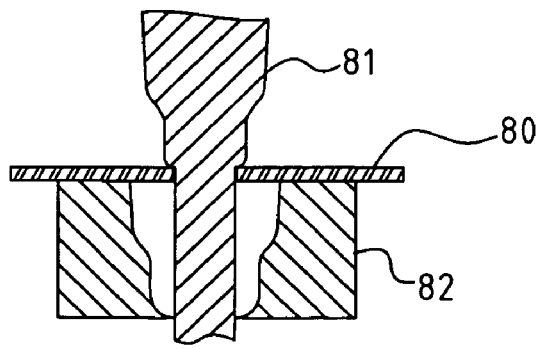
FIG. 11 shows a schematic view of a diagram of another preferred embodiment of the positioning pocket of the present invention.
Figure 11:
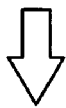
Figure 11:
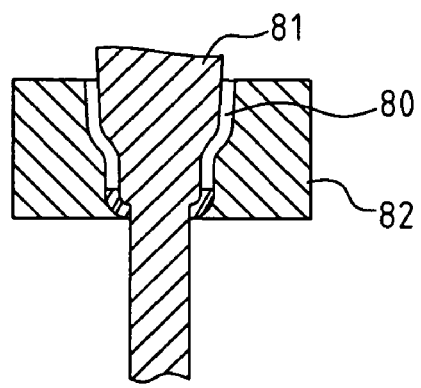
Figure 11:
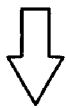
Figure 11:
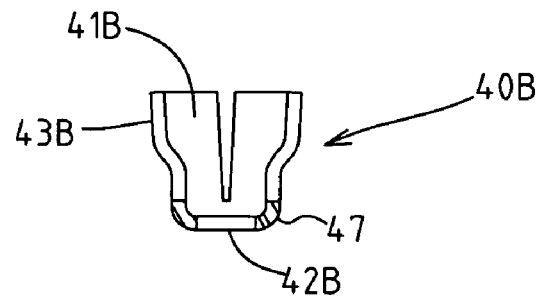

The positioning pocket 40B made of metal plate mentioned above is shown in FIG. 11, and it can be a base material for a circular metal plate 80. The circular metal plate 80 is placed between pre-designated male and female molds 81, 82, and by moving the male mold 81 toward the female mold 82 the positioning pocket is formed.

I claim:

1. A bicycle wheel apparatus comprising:
   a circular rim having a tire receiving portion and a frame extending inwardly from said tire receiving portion, said frame having a wall opposite said tire-receiving portion, said wall having a hole formed therethrough, said hole having a diameter;
   a spoke positioning pocket body having a first end and a second end with a through hole extending centrally therethrough, said through hole at said first end of said body being a straight opening extending into said body, said first end of said body having a diameter less than said diameter of said hole, said second end of said body having a plurality of claws extending circularly around said through hole, said plurality of claws being spaced from each other by a respective plurality of slots, at least one of said plurality of slots having a generally circular opening formed at an end of the slot opposite said second end, said generally circular opening having a diameter greater than a width of the slot, another of said plurality of slots extending from said first end to said second end, said another of said plurality of slots opening through a wall of said body so as to communicate with said through hole, said another of said plurality of slots having a generally circular opening formed therein between said first end and said second end, said body formed from a single metal sheet, said plurality of claws defining a generally spherical chamber, said plurality of claws being flexibly expandable between a compressed state having a maximum diameter less than said diameter of said hole and an expanded state with a maximum diameter greater than said diameter of said hole, said plurality of claws extending through said hole toward said tire receiving portion;
   a spoke tip connector having a semi-spherical head received in said chamber, said spoke tip connector having a shank extending through said through hole of said body, said shank having a threaded interior passage at an end opposite said head; and
   a spoke having a threaded end threadedly engaged with said threaded interior passage of said spoke tip connector and extending outwardly therefrom.

* * * * *